United States Patent [19]
Worley, Jr. et al.

[11] Patent Number: 5,282,036
[45] Date of Patent: Jan. 25, 1994

[54] HIGH RESOLUTION GAMMA CORRECTION METHOD AND APPARATUS FOR PIXEL INTENSITY VALUES IN A COMPUTER GRAPHICS SYSTEM USING MINIMAL MEMORY

[75] Inventors: William S. Worley, Jr., Saratoga; Hendrik W. Nelis, San Francisco, both of Calif.

[73] Assignee: Hewlett-Packard Company, Palo Alto, Calif.

[21] Appl. No.: 817,246

[22] Filed: Jan. 6, 1992

[51] Int. Cl.⁵ .............................................. H04N 9/69
[52] U.S. Cl. ....................................... 358/164; 358/32
[58] Field of Search ................................ 358/164, 32; H04N 5/202, 9/69

[56] References Cited
U.S. PATENT DOCUMENTS

| | | | |
|---|---|---|---|
| 5,008,741 | 4/1991 | Knierim et al. | 358/32 |
| 5,012,163 | 4/1991 | Alcorn et al. | 358/32 |
| 5,175,621 | 12/1992 | Maesato | 358/32 |

FOREIGN PATENT DOCUMENTS

| | | | |
|---|---|---|---|
| 0206282 | 8/1990 | Japan | H04N 5/202 |
| 2246924 | 2/1992 | United Kingdom | H04N 9/69 |

*Primary Examiner*—Victor R. Kostak
*Assistant Examiner*—Jeffery S. Murrell

[57] ABSTRACT

A gamma correction circuit in which digitized video intensity values are divided into high and low intensity ranges. Every fourth high value is gamma corrected in a lookup table and written to a frame buffer. All of the low intensity values are written to the buffer without gamma correction. The data in the buffer is mapped by a second lookup table before being converted to an analog signal. The second table maps the low intensity values to gamma corrected values and does not change the value of the high intensity values. When data is read from the frame buffer for further processing before display on a CRT, the lower intensity values need not be inverse gamma corrected. The high intensity values are inverse gamma corrected via a lookup table before such further processing.

16 Claims, 1 Drawing Sheet

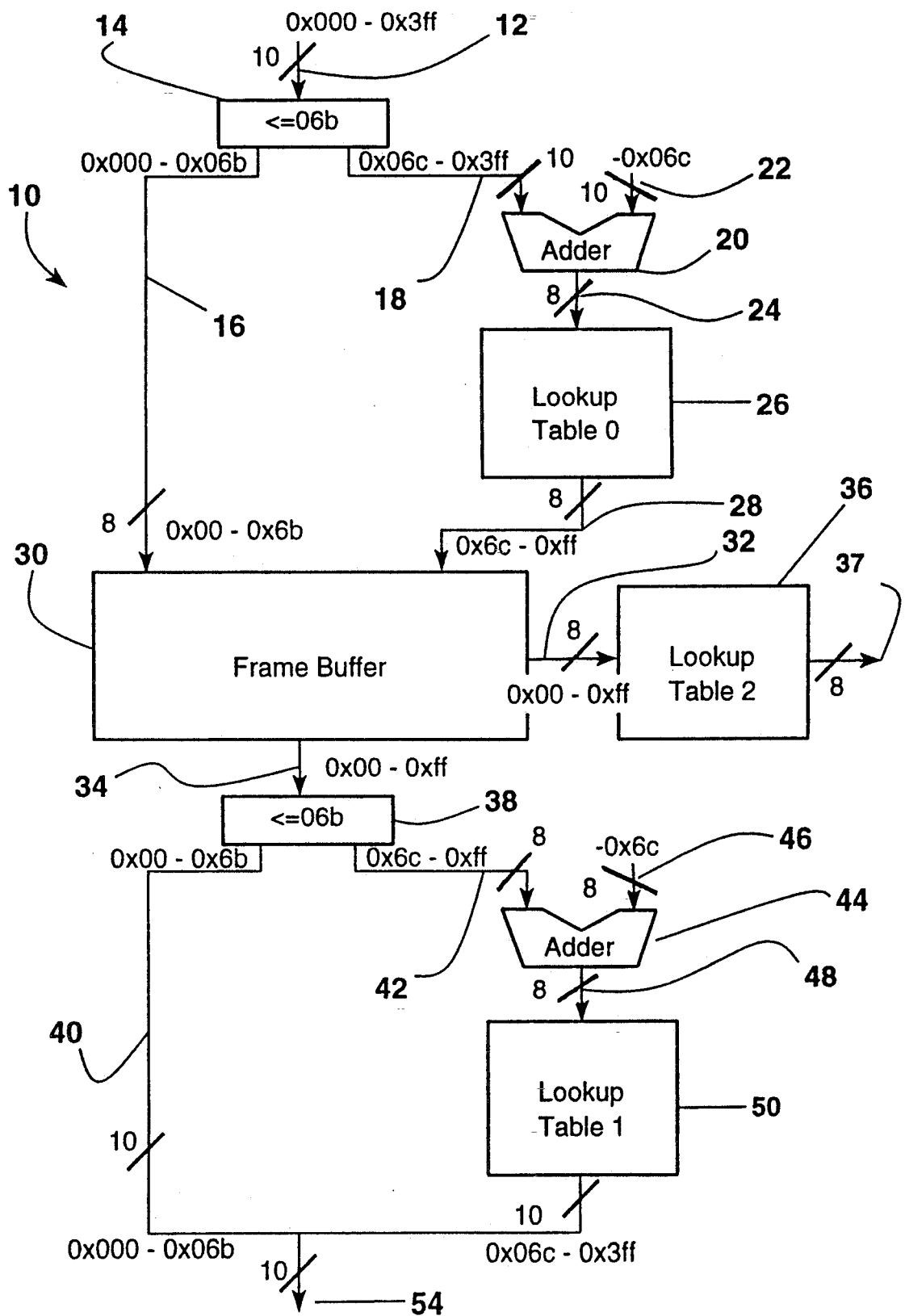

HIGH RESOLUTION GAMMA CORRECTION METHOD AND APPARATUS FOR PIXEL INTENSITY VALUES IN A COMPUTER GRAPHICS SYSTEM USING MINIMAL MEMORY

BACKGROUND OF THE INVENTION

1. Field of the Invention

The present invention relates generally to gamma correction of video intensity values for causing a linear range of video intensity values to be displayed on a cathode ray tube screen as a linear gradation of color intensities.

2. Description of the Related Art

Cathode ray tubes (CRTs) have a nonlinear transfer characteristic, i.e., the reproduced brightness on the CRT screen is a nonlinear function of the control-grid video drive. When display graphics are produced on a workstation it is necessary to compensate for this nonlinearity. The compensation of color intensity values to produce a linear gradation of color intensities in response to a linear range of color intensity values is called gamma correction.

There are several known gamma correction functions, one of which is:

$$y = (x^{1/\gamma} - k_2)/k_1$$

where x is the color intensity value to be displayed, y is the corrected color intensity value, and $\gamma$, $k_1$, and $k_2$ are constants specific to the type of CRT screen used.

A simple method of performing gamma correction on a digitized intensity signal is to translate each of the eight-bit red, green, and blue color intensity values to compensated eight-bit color intensity values using a color lookup table. The lookup table is typically stored in a solid state memory and includes a range of color intensity values, each of which is associated with a corresponding gamma corrected value. The gamma corrected value is derived from the above function and stored in the lookup table.

The gamma corrected values read from the table are converted into analog intensity signals which are applied to a control grid of the CRT. This technique has the advantage of being relatively inexpensive but it is also relatively inaccurate.

While accuracy could be increased by using ten-bit red, green, and blue color intensity values, such a scheme requires more space on an integrated circuit in which a number of video control functions may be implemented.

Another prior art method uses ten-bit color intensity values which are gamma corrected into eight-bit color intensity values that are written to a frame buffer. In this method, gamma correction is performed by using a piece-wise linear approximation of the gamma correction function. The values are read from the frame buffer and are further adjusted in a color lookup table which provides eight-bit color intensity values to a digital-to-analog converter. The first correction by way of the piece-wise linear approximation provides increased accuracy over the eight-bit system with respect to the sampling rate; however, the piece-wise linear approximation is inaccurate enough that additional correction is required by a color lookup table connected to the output of the frame buffer.

When display graphics are produced, it may be necessary to further process color intensity values in the frame buffer. For example, such processing is required when the colors of a background object are blended with the colors of a transparent object in the foreground. When such further processing is required, the gamma corrected color intensity values in the buffer are read therefrom. These values are then generally restored to their uncorrected intensity values using a piece-wise linear approximation of the inverse of the gamma correction function. This process is referred to herein as inverse gamma correction. After inverse gamma correction, additional processing to blend the colors is performed in a conventional fashion thereby creating new color intensity values. The new color intensity values are gamma corrected as described above, and then stored in the frame buffer. The new values are then converted to an analog video drive signal which is used to create a display on the CRT screen.

The prior art method utilizing approximation of the gamma correction function provides improved gamma correction over other techniques but still suffers from disadvantages. For example, there is an increase in the amount of hardware required to implement this method. Additionally, when data is read from the frame buffer for further processing as described above, information is lost. The lost information results from the approximation of the gamma correction and inverse gamma correction functions. In other words, when an uncorrected color intensity value is gamma corrected using this technique and thereafter inverse gamma corrected, the resulting color intensity value is close to, but not necessarily the same as, the original color intensity value.

SUMMARY OF THE INVENTION

The present invention comprises a method for gamma correcting video intensity values including the steps of sampling an intensity signal and storing sampled values below a preselected level in a buffer. Samples above the preselected level are gamma corrected and thereafter stored in the buffer. In another aspect, the intensity signal below the preselected level is sampled at a first sampling rate while the intensity signal above the preselected level is sampled at a second sampling rate. Apparatus for performing the method is also provided.

The present invention is advantageous in that it provides an increased sampling rate in the lower color intensity level, the levels in which the eye is most sensitive. In addition, when it is necessary to further process intensity values stored in the frame buffer, the values for the lower range need not be inverse gamma corrected because they are stored in the frame buffer prior to gamma correction. This prevents loss of information in the lower intensity range which is inherent in prior art methods and apparatus when values in the frame buffer are inverse gamma corrected.

The foregoing and other objects, features and advantages of the invention will become more readily apparent from the following detailed description of a preferred embodiment which proceeds with reference to the drawings.

BRIEF DESCRIPTION OF THE DRAWING

The drawing is a simplified schematic diagram of a gamma correction device constructed in accordance with the present invention.

DETAILED DESCRIPTION OF THE PREFERRED EMBODIMENT

Indicated generally at 10 in the drawing is a schematic diagram of a circuit constructed in accordance with the present invention. A ten-line input bus 12 provides ten-bit color intensity values from a conventional rasterizing engine (not shown). There are thus a total of 1024 different color intensity values which may appear on bus 12. The range of color intensity values is indicated adjacent the bus in hexadecimal notation as $0\times000-0\times3ff$. Similar notations appear in circuit 10 adjacent buses to indicate the range of values which may appear on the bus.

Bus 12 is connected to the input of a comparator 14. Comparator 14 provides outputs to a pair of busses 16, 18. Digital values appearing on bus 12 which are less than or equal to $0\times06b$ ($107_{10}$) appear on bus 16. All values appearing on bus 12 which are greater than $0\times06b$ appear on bus 18.

Comparator 14 may be implemented by a person having ordinary skill in the art with conventional logic gates. Bus 18 is applied to one input of an adder 20. A second bus 22 is connected to the other input of the adder and has applied thereto a digital value of $-0\times06c$ ($-108_{10}$). The output of adder 20 is applied to an eight-bit bus 24.

Adder 20 sums the values appearing on ten-bit buses 18, 22 and applies only the eight most significant bits of each result to bus 24. Thus, adder 20 functions to subtract $108_{10}$ from the value applied to bus 18 and place the eight most significant bits of the result on bus 24.

Bus 24 is applied to the input of a lookup table 26. Lookup table 26 can be implemented with either ROM or RAM memory and includes 229 entries ranging from zero to $228_{10}$ by increments of one. Each entry is mapped to a corresponding number ranging from $108_{10}-255_{10}$ as illustrated in Table 0 set forth below. Thus, for each input appearing on bus 24, lookup table 26 functions to map that number to the associated number shown in Table 0 and place the associated number on bus 28 which is connected to the output of the lookup table.

A frame buffer 30 receives inputs from both bus 16 and bus 28. It should be noted that only the eight least significant bits of bus 16 are applied to the input of the frame buffer. This, however, causes no loss of information because the two most significant bits output from comparator 14 to bus 16 are always zero. Frame buffer 30 is implemented with conventional VRAM (video random access memory).

Frame buffer 30 includes a pair of eight-bit output buses 32, 34. The contents of frame buffer 30 can be read from frame buffer 30 to an input of a lookup table 36. Lookup table 36 includes 256 integer entries, $0-255_{10}$, each of which is associated with an integer value which ranges from $23_{10}$ through $255_{10}$ as illustrated in Table 2 below. Like table 26, table 36 may be implemented in RAM or ROM and operates to map a number appearing on bus 32 into a number associated therewith in the lookup table which appears on an output bus 37. Bus 37 is connected to a conventional digital-to-analog converter (DAC) which in turn is connected to a grid in a conventional color CRT.

The contents of frame buffer 30 can also be read to bus 34 which is connected to the input of a comparator 38. Comparator 38 is substantially identical to comparator 14 and functions in the same manner. When a digital value appearing on bus 34 is less than or equal to $0\times6b$ ($108_{10}$), comparator 38 applies that value to a ten-line bus 40. At the same time, comparator 38 prepends two zeros to each value thus providing a ten-bit value having zeros as the two most significant bits.

Digital values appearing on bus 34 which are greater than $0\times6b$ are applied to an eight-line bus 42 which is connected to an input of an adder 44. Adder 44 is substantially identical to adder 20. A second bus 46 is applied to another input of the adder and presents a constant value of $-0\times6c$ ($-108_{10}$) which is added to the value appearing on bus 42 with the resultant digital value appearing on an output of the adder which is connected to a bus 48.

As is the case with the previously described lookup tables, digital values appearing on bus 48 at the input of lookup table 50 are mapped so that when a digital value in the left column of Table 1 (set forth below) appears on bus 48, the associated value is applied to the output of table 50 which is connected to bus 40. Bus 40 is connected to bus 54 which in turn is connected to the previously-mentioned rasterizing engine circuit (not shown) which, as will be recalled, generates an output that is supplied to bus 12 at the top of the drawing.

In operation, ten-bit digital values from the rasterizing engine are applied to bus 12 in sequence. The values appearing on bus 12 are referred to herein as video intensity values. These values taken in sequence form what is referred to herein as an intensity signal. The digital values on bus 12 are also referred to herein as sampled values. As previously described, those values less than or equal to $0\times06b$ ($108_{10}$) are applied to bus 16 while those above this level are applied to bus 18.

The digital values appearing on bus 16 are referred to herein as being below a preselected level while those appearing on bus 18 are referred to herein as being above the preselected level.

Adder 20 subtracts $0\times06c$ from all of the digital values appearing on bus 18 thereby generating values on bus 24 which begin at zero and extend to $0\times3ff-0\times06c$ ($915_{10}$). As will be recalled, the two least significant bits produced on the ten-line output of adder 20 are terminated therefore applying only the eight most significant bits to bus 24 which is connected to the input of lookup table 26. This has the effect of sampling every fourth value appearing on bus 18. Because 108 possible values can appear on bus 16 and 916 possible values can appear on bus 18, with all of the values appearing on bus 16 being less than bus 18, the video intensity values appearing on bus 16 are referred to herein as being in a low intensity range while those on bus 18 are in a high intensity range. The sum of the possible values which can appear on buses 16, 18 is necessarily $1024_{10}$. Because only every fourth value appearing on bus 18 appears at the input of lookup table 26, the sampling rate in the high intensity range is four times less than that of the low intensity range. A total of 229 video intensity values result from the high intensity range and may be applied via bus 24 to the input of lookup table 26.

The 229 possible values which can appear on bus 24 are mapped to corresponding values contained in lookup table 26 which are set forth above in Table 0. The mapped value then appear on bus 28. Each of the mapped values which appear on bus 28 is referred to herein as a gamma corrected value. The values in lookup table 26 are derived from the following gamma correction function:

$$y = (x^{1/\gamma} - k_2)/k_1$$

The present tables, as well as the cut-off between high and low intensity ranges and the adder offsets, relate to a Sony 16" CRT screen having $\gamma = 2.24$, $k_1 = 1.10$, $k_2 = -0.10$. It should be appreciated that the method is equally applicable to screens with different parameters.

The values on bus 16 are written directly into frame buffer 30. The intensity signal sampling on bus 16 therefore represents one of a possible 1024 values, with only 108 values falling within the low intensity range, while, as mentioned above, the values appearing on bus 28 represent one of 256 possible values with only 229 such values falling within the high intensity range.

When the color intensity values in buffer 30 are to be displayed on the CRT as a color intensity, it is read from buffer 30 to bus 32. Bus 32 is applied to the input of lookup table 36 which maps the values, from zero to $255_{10}$ to an associated integer value as shown in Table 2. The mapped value appears on bus 37 each time its associated input value is applied to bus 32.

As can be seen with reference to lookup Table 2, values previously mapped by table 26 prior to entry in buffer 30 retain the same value from buffer 30 to bus 37. Specifically, examination of Table 2 illustrates that for all input values above and including $108_{10}$ the mapped value equals the input value. Input values appearing on bus 32 below $108_{10}$, however, are mapped in accordance with Table 2. As with lookup table 26, these values are derived from the gamma correction function.

Values on bus 37 are supplied to a conventional DAC and from there are applied to bias the color CRT in a known manner to produce gamma corrected color intensities on the CRT screen.

Sometimes the color intensity values stored in frame buffer 30 as described above must be processed further. For example, when the image on the screen includes colors of a background object which are blended with the colors of a transparent object in the foreground, color intensity values for the blended portion must be created by the rasterizing engine. However, it will be recalled that the color intensity values in the high range stored in the frame buffer have been gamma corrected. Before the rasterizing engine can further process the values in the frame buffer, the values in the high range must be inverse gamma corrected, i.e., restored to their original color intensity values before gamma correction.

When it is necessary to inverse gamma correct the values in the frame buffer, the contents of the buffer are read onto bus 34. Comparator 38 routes all of the values less than 0×6b to bus 40. As will be recalled, these are the same video intensity values provided to the buffer on bus 16 and are therefore not gamma corrected.

All of the values in the high intensity range, i.e., all of those gamma corrected values in the frame buffer, are routed by comparator 38 to bus 42. These values are offset by −0×6c by adder 44 with the resulting number being applied to lookup table 50. Because there are 148 different gamma corrected values in lookup table 26, i.e., different values on bus 24 may be mapped to the same gamma corrected value (see Table 0), lookup table 50 needs only 148 entries, each of which is a ten-bit number ranging between 0×06c and 0×3ff.

The inverse gamma corrected values are provided on bus 54 to the rasterizing engine which performs conventional processing of the signals to create the desired video intensity values to display blended colors on the CRT screen. The rasterizing engine thereafter provides the processed video intensity values to bus 12 where the low intensity values are again written directly into the frame buffer and the higher intensity values are first gamma corrected and then written to the frame buffer. As before, values read from buffer 30 on bus 32 are mapped by lookup table 36 (Table 2) with the low intensity values being gamma corrected and the high intensity values being mapped into the identical value, i.e., not changed by Table 2.

The dividing line between high intensity and low intensity values which is determined by comparator 14 and comparator 38 is not arbitrary. Because the gamma correction function generally increases lower intensity values and decreases higher intensity values, the dividing line between high and low intensity values must be chosen so that a value provided to frame buffer 30 on bus 28 is not routed by comparator 38 onto bus 40 when it is necessary to inverse gamma correct the data in the buffer. If the dividing line were not so chosen, it would be possible for a high intensity value to be mapped in lookup table 26 to a gamma corrected high intensity value that falls within the uncorrected low intensity range. If such were to occur, error could be injected when the gamma corrected value read from buffer 30 on bus 34 is routed by comparator 38 onto bus 40.

The present method and apparatus is more accurate than prior methods because it digitizes the low intensity range into any of a possible 1024 values. The lower intensity range is more sensitive to the human eye and thus requires greater accuracy than the higher intensity range to create what appears to a viewer as a linear color response.

The present method and apparatus is also more accurate in the higher intensity range because the mapping tables are more accurate than piece-wise linear approximations. The present method and apparatus is also preferable to using a 1024 entry eight-bit forward lookup table for mapping all of the intensity values before entry into the frame buffer because only a 229 entry eight-bit table is required. As mentioned above, this requires less space to implement as an integrated circuit.

TABLE 0

| | | | |
|---|---|---|---|
| 0–108 | 57–164 | 114–201 | 172–230 |
| 1–110 | 58–165 | 115–201 | 173–231 |
| 2–111 | 59–166 | 116–202 | 174–231 |
| 3–112 | 60–166 | 117–203 | 175–232 |
| 4–114 | 61–167 | 118–203 | 176–232 |
| 5–115 | 62–168 | 119–204 | 177–233 |
| 6–116 | 63–169 | 120–204 | 178–233 |
| 7–117 | 64–169 | 121–205 | 179–234 |
| 8–119 | 65–170 | 122–205 | 180–234 |
| 9–120 | 66–171 | 123–206 | 181–235 |
| 10–121 | 67–171 | 124–206 | 182–235 |
| 11–122 | 68–172 | 125–207 | 183–235 |
| 12–123 | 69–173 | 126–207 | 184–236 |
| 13–124 | 70–174 | 127–208 | 185–236 |
| 14–126 | 71–174 | 128–209 | 186–237 |
| 15–127 | 72–175 | 130–210 | 187–237 |
| 16–128 | 73–176 | 131–210 | 188–238 |
| 17–129 | 74–176 | 132–211 | 189–238 |
| 18–130 | 75–177 | 133–211 | 190–239 |
| 19–131 | 76–178 | 134–212 | 191–239 |
| 20–132 | 77–178 | 135–212 | 192–239 |
| 21–133 | 78–179 | 136–213 | 193–240 |
| 22–134 | 79–180 | 137–213 | 194–240 |
| 23–135 | 80–180 | 138–214 | 195–241 |
| 24–136 | 81–181 | 139–214 | 196–241 |
| 25–137 | 82–182 | 140–215 | 197–242 |
| 26–138 | 83–182 | 141–215 | 198–242 |
| 27–139 | 84–183 | 142–216 | 199–243 |
| 28–140 | 85–184 | 143–216 | 200–243 |

TABLE 0-continued

| | | | |
|---|---|---|---|
| 29–141 | 86–184 | 144–217 | 201–243 |
| 30–142 | 87–185 | 145–217 | 202–244 |
| 31–143 | 88–185 | 146–218 | 203–244 |
| 32–144 | 89–186 | 147–218 | 204–245 |
| 33–145 | 90–187 | 148–219 | 205–245 |
| 34–145 | 91–187 | 149–219 | 206–246 |
| 35–146 | 92–188 | 150–220 | 207–246 |
| 36–147 | 93–189 | 151–220 | 208–246 |
| 37–148 | 94–189 | 152–221 | 209–247 |
| 38–149 | 95–190 | 153–221 | 210–247 |
| 39–150 | 96–190 | 154–222 | 211–248 |
| 40–151 | 97–191 | 155–222 | 212–248 |
| 41–152 | 98–192 | 156–223 | 213–249 |
| 42–152 | 99–192 | 157–223 | 214–249 |
| 43–153 | 100–193 | 158–224 | 215–249 |
| 44–154 | 101–193 | 159–224 | 216–250 |
| 45–155 | 102–194 | 160–225 | 217–250 |
| 46–156 | 103–195 | 161–225 | 218–251 |
| 47–156 | 104–195 | 162–226 | 219–251 |
| 48–157 | 105–196 | 163–226 | 220–251 |
| 49–158 | 106–196 | 164–227 | 221–252 |
| 50–159 | 107–197 | 165–227 | 222–252 |
| 51–160 | 108–197 | 166–228 | 223–253 |
| 52–160 | 109–198 | 167–228 | 224–253 |
| 53–161 | 110–199 | 168–229 | 225–253 |
| 54–162 | 111–199 | 169–229 | 226–254 |
| 55–163 | 112–200 | 170–230 | 227–254 |
| 56–163 | 113–200 | 171–230 | 228–255 |

TABLE 1

| | | | |
|---|---|---|---|
| 0–108 | 37–242 | 74–438 | 111–701 |
| 1–110 | 38–247 | 75–445 | 112–709 |
| 2–113 | 39–251 | 76–451 | 113–717 |
| 3–116 | 40–256 | 77–457 | 114–725 |
| 4–119 | 41–260 | 78–464 | 115–733 |
| 5–122 | 42–265 | 79–470 | 116–742 |
| 6–125 | 43–270 | 80–476 | 117–750 |
| 7–129 | 44–274 | 81–483 | 118–758 |
| 8–132 | 45–279 | 82–490 | 119–767 |
| 9–135 | 46–284 | 83–496 | 120–775 |
| 10–138 | 47–289 | 84–503 | 121–784 |
| 11–141 | 48–294 | 85–509 | 122–792 |
| 12–145 | 49–299 | 86–516 | 123–801 |
| 13–148 | 50–304 | 87–523 | 124–810 |
| 14–151 | 51–309 | 88–530 | 125–818 |
| 15–155 | 52–314 | 89–537 | 126–827 |
| 16–158 | 53–319 | 90–544 | 127–836 |
| 17–162 | 54–324 | 91–551 | 128–845 |
| 18–166 | 55–330 | 92–558 | 129–854 |
| 19–169 | 56–335 | 93–565 | 130–863 |
| 20–173 | 57–340 | 94–572 | 131–872 |
| 21–177 | 58–346 | 95–579 | 132–881 |
| 22–180 | 59–351 | 96–586 | 133–890 |
| 23–184 | 60–357 | 97–594 | 134–899 |
| 24–188 | 61–362 | 98–601 | 135–908 |
| 25–192 | 62–368 | 99–608 | 136–917 |
| 26–196 | 63–373 | 100–616 | 137–927 |
| 27–200 | 64–379 | 101–623 | 138–936 |
| 28–204 | 65–385 | 102–631 | 139–946 |
| 29–208 | 66–391 | 103–638 | 140–955 |
| 30–212 | 67–396 | 104–646 | 141–965 |
| 31–216 | 68–402 | 105–654 | 142–974 |
| 32–220 | 69–408 | 106–662 | 143–984 |
| 33–225 | 70–414 | 107–669 | 144–994 |
| 34–229 | 71–420 | 108–677 | 145–1003 |
| 35–233 | 72–426 | 109–685 | 146–1013 |
| 36–238 | 73–432 | 110–693 | 147–1023 |

TABLE 2

| | | | |
|---|---|---|---|
| 0–23 | 64–90 | 128–128 | 192–192 |
| 1–34 | 65–91 | 129–129 | 193–193 |
| 2–37 | 66–91 | 130–130 | 194–194 |
| 3–40 | 67–92 | 131–131 | 195–195 |
| 4–43 | 68–92 | 132–132 | 196–196 |
| 5–45 | 69–93 | 133–133 | 197–197 |
| 6–47 | 70–93 | 134–134 | 198–198 |
| 7–48 | 71–94 | 135–135 | 199–199 |
| 8–50 | 72–94 | 136–136 | 200–200 |

TABLE 2-continued

| | | | |
|---|---|---|---|
| 9–51 | 73–95 | 137–137 | 201–201 |
| 10–53 | 74–95 | 138–138 | 202–202 |
| 11–54 | 75–95 | 139–139 | 203–203 |
| 12–55 | 76–96 | 140–140 | 204–204 |
| 13–56 | 77–96 | 141–141 | 205–205 |
| 14–57 | 78–97 | 142–142 | 206–206 |
| 15–58 | 79–97 | 143–143 | 207–207 |
| 16–59 | 80–97 | 144–144 | 208–208 |
| 17–60 | 81–98 | 145–145 | 209–209 |
| 18–61 | 82–98 | 146–146 | 210–210 |
| 19–62 | 83–99 | 147–147 | 211–211 |
| 20–63 | 84–99 | 148–148 | 212–212 |
| 21–64 | 85–100 | 149–149 | 213–213 |
| 22–65 | 86–100 | 150–150 | 214–214 |
| 23–66 | 87–100 | 151–151 | 215–215 |
| 24–67 | 88–101 | 152–152 | 216–216 |
| 25–67 | 89–101 | 153–153 | 217–217 |
| 26–68 | 90–102 | 154–154 | 218–218 |
| 27–69 | 91–102 | 155–155 | 219–219 |
| 28–70 | 92–102 | 156–156 | 220–220 |
| 29–70 | 93–103 | 157–157 | 221–221 |
| 30–71 | 94–103 | 158–158 | 222–222 |
| 31–72 | 95–103 | 159–159 | 223–223 |
| 32–73 | 96–104 | 160–160 | 224–224 |
| 33–73 | 97–104 | 161–161 | 225–225 |
| 34–74 | 98–105 | 162–162 | 226–226 |
| 35–75 | 99–105 | 163–163 | 227–227 |
| 36–75 | 100–105 | 164–164 | 228–228 |
| 37–76 | 101–106 | 165–165 | 229–229 |
| 38–76 | 102–106 | 166–166 | 230–230 |
| 39–77 | 103–106 | 167–167 | 231–231 |
| 40–78 | 104–107 | 168–168 | 232–232 |
| 41–78 | 105–107 | 169–169 | 233–233 |
| 42–79 | 106–107 | 170–170 | 234–234 |
| 43–80 | 107–108 | 171–171 | 235–235 |
| 44–80 | 108–108 | 172–172 | 236–236 |
| 45–81 | 109–109 | 173–173 | 237–237 |
| 46–81 | 110–110 | 174–174 | 238–238 |
| 47–82 | 111–111 | 175–175 | 239–239 |
| 48–82 | 112–112 | 176–176 | 240–240 |
| 49–83 | 113–113 | 177–177 | 241–241 |
| 50–83 | 114–114 | 178–178 | 242–242 |
| 51–84 | 115–115 | 179–179 | 243–243 |
| 52–84 | 116–116 | 180–180 | 244–244 |
| 53–85 | 117–117 | 181–181 | 245–245 |
| 54–86 | 118–118 | 182–182 | 246–246 |
| 55–86 | 119–119 | 183–183 | 247–247 |
| 56–87 | 120–120 | 184–184 | 248–248 |
| 57–87 | 121–121 | 185–185 | 249–249 |
| 58–88 | 122–122 | 186–186 | 250–250 |
| 59–88 | 123–123 | 187–187 | 251–251 |
| 60–89 | 124–124 | 188–188 | 252–252 |
| 61–89 | 125–125 | 189–189 | 253–253 |
| 62–89 | 126–126 | 190–190 | 254–254 |
| 63–90 | 127–127 | 191–191 | 255–255 |

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for gamma correcting video intensity values comprising the steps of:
   sampling an intensity signal below a preselected level at a first sampling rate;
   sampling the intensity signal above the preselected level at a second sampling rate by selecting every nth intensity signal sample taken at said first sampling rate, where n is an integer; and
   looking up each value sampled at said second sampling rate in a table to locate a corresponding gamma corrected value.

2. The method of claim 1 wherein said second sampling rate is less than said first sampling rate.

3. The method of claim 2 wherein said first sampling rate is four times as fast as said second sampling rate.

4. The method of claim 1 wherein each intensity signal sample is a digital number and wherein the step of selecting every nth intensity signal sample taken at said first sampling rate comprises the step of deleting a predetermined number of the least significant bits of each intensity signal sample.

5. The method of claim 1 wherein said method further includes the step of storing the sampled values in a buffer.

6. The method of claim 5 wherein the step of looking up each sampled value in a table to locate a corresponding gamma corrected value comprises the step of looking up the values sampled at said second sampling rate before the step of storing the sampled values in a buffer.

7. An apparatus for gamma correcting video intensity values comprising:
    means for sampling an intensity signal below a preselected level at a first sampling rate;
    means for sampling the intensity signal above the preselected level at a second sampling rate by selecting every nth intensity signal sample taken at said first sampling rate, where n is an integer; and
    a lookup table comprising a plurality of video intensity values above the preselected level each of which is associated with a corresponding gamma corrected intensity value.

8. The apparatus of claim 7 wherein said second sampling rate is less than said first sampling rate.

9. The apparatus of claim 7 wherein each intensity signal sample is a digital number and wherein said means for selecting every nth intensity signal sample taken at said first sampling rate comprises means for deleting a predetermined number of the least significant bits of each intensity signal sample.

10. The apparatus of claim 7 wherein said apparatus further comprises a buffer for storing the sampled values.

11. The apparatus of claim 10 wherein said lookup table is operatively connected to an input of said buffer.

12. The apparatus of claim 10 further comprising a second lookup table operatively connected to an output of said buffer.

13. A method for gamma correcting video intensity values comprising the steps of:
    sampling an intensity signal;
    storing sampled values below a preselected level;
    selecting every nth intensity signal sample above said preselected level;
    converting the selected samples to gamma corrected values; and
    storing the gamma corrected values in the buffer.

14. The method of claim 13 wherein said method further includes the step of sampling the intensity signal above the preselected level at a rate slower than that below the preselected level.

15. The method of claim 13 wherein said method further includes the steps of:
    reading the values from the buffer;
    looking up the gamma corrected values in a table to locate a corresponding uncorrected value; and
    further processing the values derived from the table and the uncorrected values read from the buffer.

16. The method of claim 13 wherein said method further includes the steps of:
    reading the values from the buffer; and
    correcting samples below the preselected level to gamma corrected values.

* * * * *